Feb. 4, 1930. L. E. REED 1,745,452
STEERING SLED
Filed March 12, 1928  2 Sheets-Sheet 2

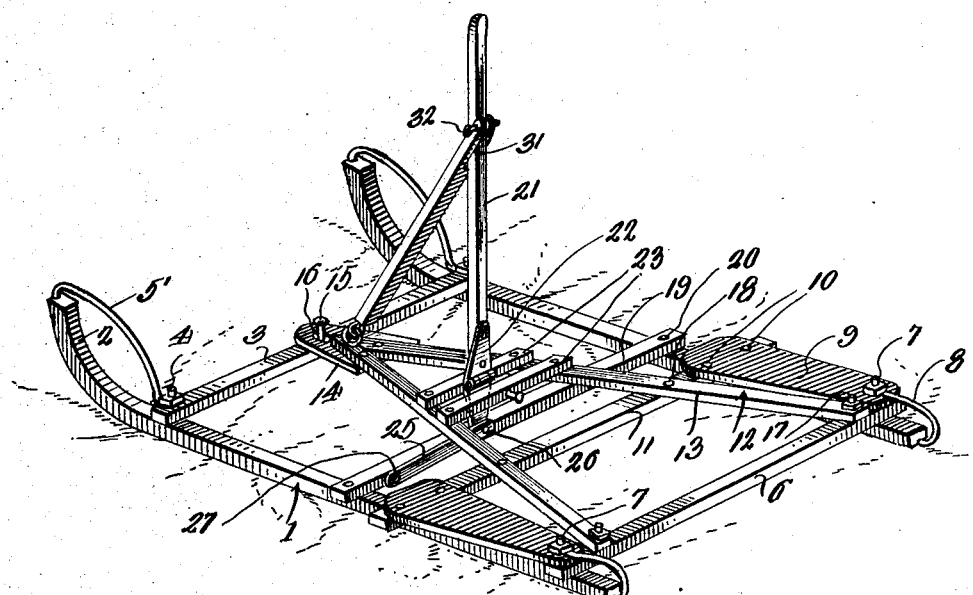

WITNESSES

Inventor
LAWRENCE E. REED
By Irving L. McEathran
Attorney

Patented Feb. 4, 1930

1,745,452

UNITED STATES PATENT OFFICE

LAWRENCE E. REED, OF STANTON, NEBRASKA

STEERING SLED

Application filed March 12, 1928. Serial No. 261,089.

This invention relates to improvements in sleds and more particularly that type which is capable of being steered, and one of the objects of the present invention is to provide a sled embodying steering mechanism so constructed as to permit of steering of the sled with a greater accuracy and with greater certainty than is possible by the use of sleds of this type previously employed.

In the ordinary sled of the steering type, provision is made for flexing of the forward portions of the runners of the sled in order to steer the sled, but this arrangement is not wholly satisfactory for the reason that, in steering, there is liable to be a skidding of the rear runners, in the event the surface is of a hard or icy nature, or, if the surface is more or less yieldable as for example fresh fallen snow, the snow is liable to offer such resistance to the intermediate and rear portions of the runners of such a sled as to materially interfere with steering. In consideration of the foregoing, the present invention therefore has as a further object to provide, in a sled of the type referred to, means operable to warp or flex the runners of the sled throughout substantially their entire length, so that the liability of skidding is avoided and the sled is capable of being more accurately guided in its changed course of travel and can be guided with less resistance being offered to the change in direction of travel of the runners through the snow, than is possible in the use of sleds in which the forward portions of the runners alone are flexed.

Another disadvantage presented by steering sleds of the ordinary construction is that the position of the body of the one occupying and steering the sled is not appreciably changed in manipulating the steering means, this means ordinarily consisting of a swinging cross bar arranged in a horizontal position and adapted to be grasped at its ends and operated in one direction or the other to effect flexing of the forward portions of the runners of the sled. As a consequence, it not infrequently happens that sleds of this type will overturn in making sharp turns. Therefore the present invention has as a further object to provide a sled so constructed that the controlling means for adjusting the runner warping or flexing means will be constructed and arranged to be operated in such a manner that the operator's body will be naturally inclined in the direction in which the turn is to be made, in a manner very much simulating the rider of a bicycle or motorcycle, or a skater, so that, in the instance of the present invention, overturning of the sled is practically prevented and the steering means provides for the making of much sharper turns than is possible with steering devices as heretofore constructed, without any likelihood of overturning of the sled, and in this connection the invention likewise contemplates so constructing and arranging the control means that the one using the sled may, if desired, actuate the controlling means continuously to cause the sled to take a more or less tortuous path, travelling from side to side along a general course, when coasting down hill, thus rendering the sport more exhilarating.

In general the invention contemplates the provision of a steering sled which will be more flexible than sleds of the ordinary type and which will at the same time be exceptionally light in weight and simple in construction, so that it may be conveniently carried on one shoulder or may be drawn over the snow covered ground with little labor.

Another object of the invention is to so construct the control devices that when not in use they may be disposed to occupy but little space substantially in the plane of the sled body.

As above stated, in the ordinary types of steering sleds, the forward portions only of the runners are flexed in steering the sleds, and in view of the disadvantages of this method of steering, as outlined above, the present invention has as a further object to provide novel means whereby both runners may be simultaneously and correspondingly flexed or warped throughout substantially their entire length, thus insuring more accurate and effective steering of the sled and obviating side slipping or skidding which is liable to occur where the ordinary types of steering sleds are employed.

While the accompanying drawings and the description which is to follow, constitute a disclosure of the preferred embodiment of the invention, it will be understood that various changes may be made within the scope of what is claimed.

In the accompanying drawings:

Figure 1 is a perspective view of the sled embodying the invention;

Figure 2 is a vertical longitudinal sectional view through the sled, the control means for the steering mechanism of the sled being illustrated in full lines in upright and operative position and in broken lines in a lowered position;

Figure 3:
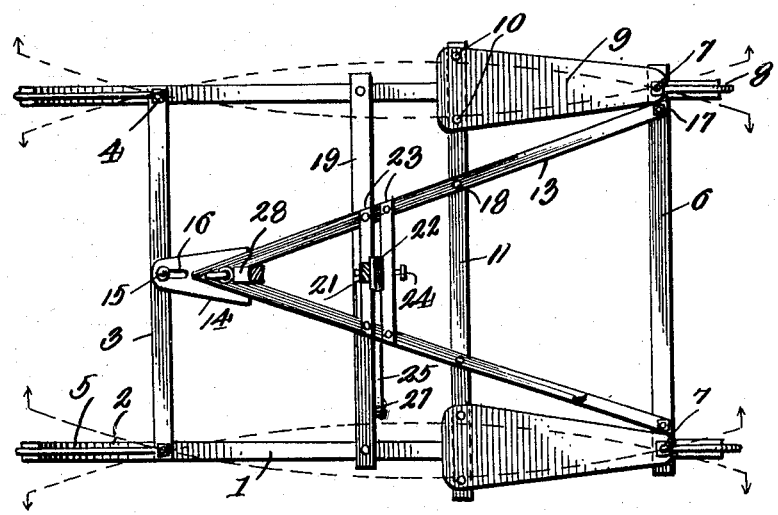
Figure 3 is a horizontal sectional view taken substantially on the line 3—3 of Figure 2 looking in the direction indicated by the arrows, the view illustrating the runners in full lines in normal position and, in broken lines, the positions they are caused to assume in steering the sled to the right and to the left.

In the drawings the two runners of the sled are indicated in general by the numeral 1 and these runners are preferably of some relatively flexible wood and have their forward end portions turned upwardly as indicated by the numeral 2 and according to common practice. Near their forward ends 2, the runners 1 are connected by a cross bar 3 the ends of which are connected to the runners by bolts 4, a single bolt being provided at each end of the cross bar 3 so that the runners are capable of pivotal movement, about said bolts, with respect to the cross bar. The wooden runners 1 are formed in their under sides with longitudinally extending channels 4' which are preferably approximately of semi-cylindrical form and in which are disposed rods 5 which are circular in cross section and which are of metal and constitute sections of the respective runners, the forward end of each rod being bent to extend rearwardly and downwardly from the upturned forward end 2 of the respective runner 1 as indicated by the numeral 5' and anchored by the bolts 4. A cross bar 6, corresponding to the cross bar 3, is provided for connecting the rear ends of the runners 1, bolts 7 being fitted through the ends of the cross bar and through the runners near the rear ends of the latter, for this purpose, and, in this instance, single bolts are provided at the ends of the cross bar so that a pivotal connection is established between the runners and the said ends of the cross bar. The rear portions of the rods 5 are bent, at the rear ends of the runners 1, to extend upwardly and forwardly and are anchored by the bolts 7.

Ordinarily the one using the sled, embodying the invention, will occupy a standing position or a stooping position, and in order that a firm foothold may be obtained, foot plates 9 are connected each at its rear end to a respective one of the bolts 7 and at its forward end by bolts 10 to the ends of a cross bar 11 which extends transversely between the forward ends of the foot plates and which rests upon the upper sides of the runners 1 as clearly shown in Figures 1 and 2 of the drawings.

The numeral 12 indicates in general a frame which comprises side bars 13 arranged in forwardly converging relation and bolted or otherwise secured at their forward ends to a supporting plate 14 which is connected at its forward end to the cross bar 3 through the medium of a pin 15 which upstands from the said bar midway between the ends thereof and through a slot 16 formed to extend in a front-to-rear direction in the said plate 14. The side bars 13 of the frame 12 are connected at their rear ends by bolts 17, to the rear cross bar 6 near the ends of the latter and immediately inwardly of the rear ends of the foot plates 9, the said side members 13 being further bolted or otherwise secured as at 18 to the bar 11 at their points of intersection with the said bar, and the said side members 13 being extended above an intermediate cross bar 19 which extends transversely between the runners 1 midway between the front and rear bars 3 and 6 and which is connected at its ends to the runners through the medium of bolts 20.

The frame 12 is designed to support the control means heretofore referred to and this means comprises a hand lever which is indicated by the numeral 21 and to the lower end of which is secured one leaf of a hinge 22 the other leaf of which hinge is disposed to extend vertically between a pair of cross bars 23 mounted transversely upon the side members 13 of the frame 12 above and slightly in rear of the cross bar 19, a pivot pin 24 being fitted through the said cross bars 23 and through the last mentioned leaf of the hinge 22 so that in this manner the lever 21 is mounted upon the cross bars 23 for transverse rocking movement. A link 25 is pivotally connected at one end as at 26 to the lower end of the said lower hinge leaf 22 and at its other end as at 27 to the cross bar 19 adjacent one end of said bar.

In order that the operating hand lever 21 may be supported in an upright position where it may be conveniently grasped by one standing upon the foot plates 9, a brace bar 28 is provided at its lower end with an eye 29 which is freely pivotally engaged with a similar eye 30 mounted upon the plate 14 at the point of juncture of the forward ends of the side members 13 of the frame 12, and the upper end of this brace bar is bifurcated as indicated by the numeral 31 to accommodate the intermediate portion of the lever 21, a pivot pin 32 being removably fitted through registering openings in the upper end of the said bar 28 and the said lever 21 and serving to connect the parts with the lever in vertical position and the bracing bar 28 in inclined position as clearly shown in Figures 1 and 2 of the drawings.

Figures 4, 5, 6:
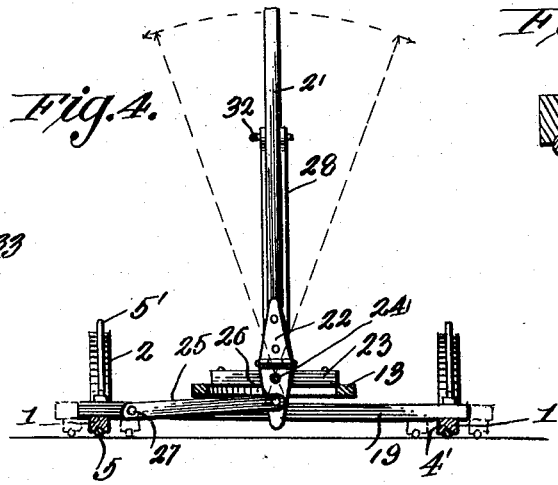
Figure 4 is a vertical transverse sectional view taken substantially on the line 4—4 of Figure 2 looking in the direction indicated by the arrows, the runners being shown in full lines in the normal positions and in broken lines in the positions which they will occupy in steering the sled.
Figure 5 is a vertical transverse sectional view, in detail, taken substantially on the line 5—5 of Figure 2.
Figure 6 is a view similar to Figure 5 illustrating a slightly modified form of runner.

As illustrated more clearly in Figures 3 and 4 of the drawings and as will be evident from the foregoing description, a lateral swinging of the lever 21 in one direction or the other will effect a reverse shifting of the cross bar 19 through the medium of the link connection 25, with the result that a thrust will be exerted laterally against the intermediate portion of the runners 1 in the corresponding direction thus causing a longitudinal flexing or warping of the runners throughout their entire length as shown in broken lines in the said Figures 3 and 4, and it will be evident that if the lever 21 is, for example, swung to the right, the runners will be flexed or warped toward the left, their form being changed from a straight line form to a curvilinear form, and therefore the sled will be caused to turn to the right, a swinging of the lever 21 toward the left effecting a reverse flexing or warping of the runners so as to steer the sled toward the left. At this point it will be observed that, while the runners are resilient and flexible, they nevertheless possess considerable strength, and therefore, in making a right hand turn, for example, the one using the sled will naturally sway the body toward the right in correspondingly swinging the lever 21 so that, as the sled turns toward the right, the weight of the user of the sled is imposed upon the sled in precisely the desirable manner necessary to insure against overturning of the sled. By providing the slot 16 in the plate 14 and connecting the plate to the cross bar 3 through the medium of the pin 15 which extends upwardly through said slot, it will be evident that the slight decrease in the length of the runners which takes place when they are flexed or warped, or in other words the relative displacement of the cross bars 3 and 6 which takes place at this time due to the change in form of the runners, is compensated for by this connection.

As stated, the pin 32 is removable, and therefore, when the sled is to be carried over one's shoulder by engaging the arm between the cross bars 6 and 11, the lever 21 may be swung to substantially the broken line position shown in Figure 2, and the brace bar 28 may be permitted to pivot about the eye 30 and assume, likewise, substantially the broken line position shown in said figure. It will also be evident that by removing the pin 32, the brace bar may be employed as a means for drawing the sled over the snow covered ground surface.

It will be evident that due to the loose pivotal connection provided between the lower end of the brace member 28 and the plate 14, the said brace member is adapted to move with the operating lever 21 and brace the same at all times without in any way interfering with such movement.

As illustrated in Figure 6 of the drawing, the runners, which are indicated by the numeral 33, may be of channel iron formation.

Having thus described the invention, what I claim is:

1. In a sled of the class described, flexible runners, front and rear cross bars pivotally connected to the runners, a frame supported by the cross bars, a lever extending upwardly from the frame and mounted thereon for rocking movement about a horizontal axis, an operative connection between the lever and the intermediate portions of the runners for effecting corresponding flexing of the runners upon the adjustment of the lever.

2. In a sled of the class described, flexible runners, front and rear cross bars pivotally connected to the runners, a frame supported by the cross bars, a lever extending upwardly from the frame and mounted thereon for rocking movement about a horizontal axis and transversely of the sled, and operative connection between the lever and the intermediate portions of the runners for effecting corresponding flexing of the runners upon the adjustment of the lever.

3. In a sled of the character set forth, flexible runners, front and rear cross bars pivotally connected to the runners, a frame supported by the cross bars, a lever having upper and lower sections pivotally connected together, means connecting the lower section of the lever to the frame for rocking movement in a direction angularly related to the pivotal axis of the lever section, and operative connection between the lower section of the lever and the intermediate portions of the runners for effecting corresponding flexing of the runners upon adjustment of the lever about the axis of its pivotal connection with the sled.

4. In a sled of the class described, runners, cross bars extending between the front and rear end portions of the runners and pivotally connected thereto, a frame supported by said cross bars, a cross bar extending between the intermediate portions of the runners and secured at its ends thereto, a lever mounted upon the frame for transverse swinging movement, and a link connecting the lever with the said intermediate cross bar, the lever constituting means acting through the medium of the said link and intermediate cross bar for simultaneously flexing the runners to corresponding curvilinear form.

5. In a sled of the class described, runners, cross bars extending between the front and rear end portions of the runners and pivotally connected at their ends thereto, foot plates connected to the ends of the rear cross bar and supported at their rear ends thereby, a cross bar extending between and connecting the forward ends of the foot plates and resting upon the runners, a frame mounted upon the said cross bars, a lever mounted upon the frame for transverse swinging movement and having its lower end extending below the frame, a cross bar extending between the intermediate portions of the runners and secured at its ends thereto, and a link pivotally connected to the last mentioned cross bar and to the said lower end of the lever.

6. In a sled of the class described, runners, front and rear cross bars extending between the front and rear end portions of the runners and pivotally connected at their ends therewith, a frame including side members connected at their rear ends to the rear cross bar, means slidably connecting the members at their forward ends with the front cross bar to compensate for relative front to rear displacement of said bars, a lever mounted for rocking movement between the runners and between the said cross bars, upon the said frame, a bar extending between the runners and secured at its ends to the intermediate portions thereof, and operative connection between the lower end of the lever and the last mentioned bar to provide for flexing of the runners to curvilinear form upon lateral swinging adjustment of the lever in either direction.

7. In a sled of the class described, runners, means pivotally connecting the runners adjacent their front and rear ends, a lever supported for transverse swinging adjustment between the runners, the lever being foldable to position between the runners, a brace separably pivotally connected with the lever and supporting the same and movable with the lever in its lateral swinging adjustment, and operative connection between the lower end of the lever and the intermediate portions of the runners.

8. In a sled of the class described, flexible runners, front and rear cross bars pivotally connected to the runners, a third cross bar resting upon the runners, foot plates secured to said third cross bar and the rear cross bar, a V-shaped frame having a loose pivotal connection with the front cross bar and fixed to the other cross bars, and means by which the runners may be flexed.

In testimony whereof I affix my signature.

LAWRENCE E. REED.